(12) United States Patent
Bianchi et al.

(10) Patent No.: US 11,106,990 B2
(45) Date of Patent: Aug. 31, 2021

(54) DETECTING MOTION-SENSOR DATA ANOMALIES

(71) Applicant: International Business Machines Corporation, Armonk, NY (US)

(72) Inventors: Thiago Bianchi, Sao Carlos (BR); John Donald Vasquez, Munich (DE); Joao Souto Maior, Jaboatao dos Guararapes (BR)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 16/287,055

(22) Filed: Feb. 27, 2019

(65) Prior Publication Data

US 2020/0272924 A1 Aug. 27, 2020

(51) Int. Cl.
*G06N 7/00* (2006.01)
*G06F 9/54* (2006.01)

(52) U.S. Cl.
CPC ............. *G06N 7/005* (2013.01); *G06F 9/542* (2013.01)

(58) Field of Classification Search
CPC .................................. G06N 7/005; G06F 9/542
See application file for complete search history.

(56) References Cited

U.S. PATENT DOCUMENTS

| | | | |
|---|---|---|---|
| 8,510,255 B2 | 8/2013 | Fadell et al. | |
| 10,037,025 B2 | 7/2018 | Pallath et al. | |
| 10,467,327 B1* | 11/2019 | Arazi | G06Q 50/01 |
| 2005/0060357 A1* | 3/2005 | Prowell | G06F 11/3608 708/200 |
| 2014/0324752 A1 | 10/2014 | Statnikov et al. | |
| 2015/0323391 A1* | 11/2015 | McCulloch | G01K 13/02 374/185 |
| 2016/0155062 A1* | 6/2016 | Fisher | G06N 20/00 706/12 |
| 2017/0147872 A1* | 5/2017 | Maroy | G06K 9/52 |

OTHER PUBLICATIONS

Dong et al., "Building energy and comfort management through occupant behaviour pattern detection based on a large-scale environmental sensor network", IBPSA-Boston, Seminar on Occupancy, Plug Loads, and Building Simulation, May 19, 2011, Carnegie Mellon, Article in Journal of Building Performance Simulation, Dec. 2011, DOI: 10.1080/19401493.2011.577810.

(Continued)

*Primary Examiner* — Tuan C Dao
(74) *Attorney, Agent, or Firm* — David K. Mattheis; Maeve M. Carpenter

(57) ABSTRACT

Detecting motion-sensor data anomalies by registering an event associated with received motion-detector sensor data at a current timestamp, calculating, a timestamp delta between a previous timestamp and the current timestamp, and counting transitions between a set of timestamp deltas using a finite state machine. The anomaly detection also includes using a Markov chain transition matrix, generated from the finite state machine, to determine that, a probability of transitioning from a current state to a next state associated with the event, is less than a predetermined value, and registering an anomaly associated with the sensor and the event.

20 Claims, 6 Drawing Sheets

(56) References Cited

OTHER PUBLICATIONS

Dong et al., "Sensor-Based Occupancy Behavioral Pattern Recognition for Energy and Comfort Management in Intelligent Buildings", Building Simulation 2009, Eleventh International IBPSA Conference, Glasgow, Scotland, Jul. 27-30, 2009, pp. 1444-1451.

Kendall, David G., "Stochastic Processes Occurring in the Theory of Queues and their Analysis by the Method of the Imbedded Markov Chain", Source: The Annals of Mathematical Statistics, vol. 24, No. 3 (Sep. 1953), pp. 338-354 Published by: Institute of Mathematical Statistics, Stable URL: <https://www.jstor.org/stable/2236285>, Accessed: Feb. 13, 2019 17:31 UTC.

Koushanfar et al., "Markov Chain-based Models for Missing and Faulty Data in MICA2 Sensor Motes", pp. 576-579, © 2005 IEEE, <http://citeseerx.ist.psu.edu/viewdoc/download?doi=10.1.1.118.687&rep=rep1&type=pdf>.

Lam et al., "Occupancy Detection Through an Extensive Environmental Sensor Network in an Open-Plan Office Building", Building Simulation 2009, Eleventh International IBPSA Conference, Glasgow, Scotland, Jul. 27-30, 2009, pp. 1452-1459.

Mell et al., "The NIST Definition of Cloud Computing", Recommendations of the National Institute of Standards and Technology, Special Publication 800-145, Sep. 2011, 7 pages.

Raafat et al., "Fog Intelligence for Real-time IoT Sensor Data Analytics", Article in IEEE Access, Sep. 2017, DOI: 10.1109/ACCESS.2017.2754538, pp. 1-7, <https://www.researchgate.net/publication/319947528_Fog_Intelligence_for_Real-time_IoT_Sensor_Data_Analytics>.

Wei et al., "Research of IOT Intrusion Detection System Based on Hidden Markov Model", Applied Mechanics and Materials, ISSN: 1662-7482, vols. 263-266, pp. 2949-2952, doi:10.4028/www.scientific.net/AMM.263-266.2949, © 2013 Trans Tech Publications, Switzerland, Online: Dec. 27, 2012, <http://citeseerx.ist.psu.edu/viewdoc/download?doi=10.1.1.854.2960&rep=rep1&type=pdf>.

Zachrisson, Mauritz, "Optimizing Hidden Markov Models for the Internet of Things", Bachelor's Thesis in Computer Science, Date: Jun. 1, 2017, Supervisor: Alexander Kozlov, 40 pages, <http://www.diva-portal.org/smash/get/diva2:1108474/FULLTEXT01.pdf>.

* cited by examiner

Fig. 2

DETECTING MOTION-SENSOR DATA ANOMALIES

BACKGROUND

The disclosure relates generally to processing data from motion-detection sensors. The disclosure relates particularly to detecting event anomalies in motion-sensor data.

Smart buildings may include multitudes of different sensors including Internet of Things (IoT) sensors, to monitor conditions in and around the buildings. The sensors of a single building may generate large amounts of data. Sensor data may provide specific real-time information—doors are open or closed, rooms have particular temperatures, lights are on or off. The sensor data may be collected and processed using local, or remote, discrete or distributed processing systems.

SUMMARY

Aspects of the invention disclose methods, systems and computer readable media associated with detecting motion-sensor data anomalies by registering an event associated with received motion-detection sensor data having a current timestamp, calculating, a timestamp delta between a previous timestamp and the current timestamp, and counting transitions between a set of timestamp deltas using a finite state machine. The anomaly detection also includes using a Markov chain transition matrix generated using the finite state machine, to determine that, a probability of transitioning from a current state to a next state associated with the event, is less than a predetermined value; and registering an anomaly associated with the sensor and the event.

BRIEF DESCRIPTION OF THE DRAWINGS

FIG. 2 provides a schematic illustration of a Markov chain transition matrix, according to an embodiment of the invention.

DETAILED DESCRIPTION

Figure 1:
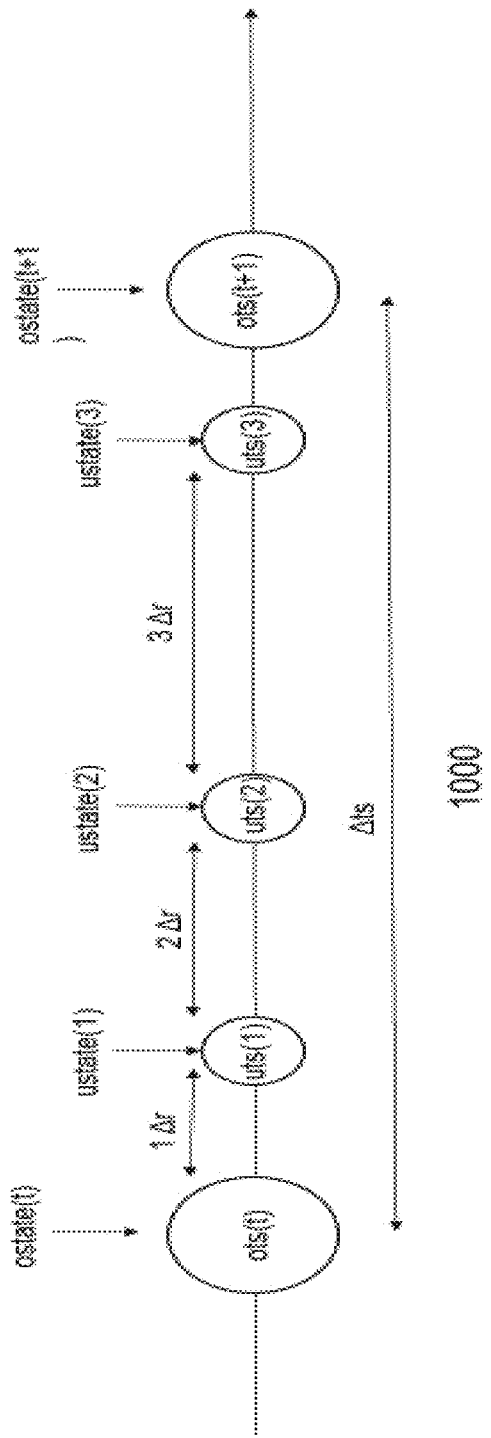
FIG. 1 provides a schematic illustration of variable relationships, according to an embodiment of the invention.

Smart buildings comprising multitudes of sensors may generate large volumes of data. Some of the provided data may be directly useful—door status, temperature values, etc. A large portion of the data may not have an obvious use and may require effort to transform from raw data to useful information. The transformation should result in information which can support decisions in real-time or near real-time.

Smart building sensors may include motion sensors which provide an indication of the presence, or absence, of individuals in associated physical spaces. The data may have the immediate use of enabling or disabling lighting and ventilation associated with the physical spaces, but a larger picture regarding the patterns of use of the spaces of the building may reside within the data. Extracting such information may result in insights regarding over- and under- utilized spaces. Such insights may be used to alter planned uses of spaces to more closely align the planned utilization with actual utilization. Alterations to leasing terms may also rise out of such information. In one example, motion sensor data may be used to determine occupied space billing amounts. Changes in usage patterns may trigger billing scenarios beyond planned normal use patterns.

In an embodiment, a computer implemented process for processing motion-sensor data begins with receiving the motion sensor data. In an embodiment, the data may arise from wireless or wired motion sensors connected to a network. The data may be consolidated at a logical processor. The actual processor may comprise a single computing system, or the logical processor may comprise a distributed computing system.

The motion-sensor data may include a timestamp associated with the submission of the data. The data may also include cumulative motion reading, the sum of values the sensor has detected since being put into service. The sensors may send data at discrete intervals, or continuously, and not only when motion is detected. To determine that motion has been detected, it may be necessary to retain the values associated with the last motion detected in order to determine if new data represents a new detected motion.

In an embodiment, the motion-sensor cumulative data may include a false motion report. In an embodiment, false reports are associated with an increase in the cumulative count of one. In an embodiment, the effects of false reports may be reduced by reviewing the cumulative record and recognizing new motion events when the cumulative output increases by at least two. A count increase of only one indicating fleeting, and false motion detection.

The sensor data may be considered as a series of records each having its own timestamp. A discrete, unidimensional space based upon the intervals (timestamp deltas) between successive timestamps may be built and a finite state machine may then be created to count the actual transitions between the timestamp deltas associated with different building states.

The finite state machine output may then be used to calculate probabilities between different building states, as represented by the motion-sensor data using a probability engine for the data. The probability engine may be created using neural networks or Markov Chain transition matrices. The Markov Chain matrices may require less resources to calculate the probabilities and may also perform with a smaller data set.

Once the probability engine has been created, new motion-sensor event data may be passed to the engine. A threshold probability may be defined to differentiate between normal usage events and abnormal usage events. A low probability indicates that a current event is unlikely in view of past usage patterns and likely indicates either a new pattern of usage or aberrant usage. In an embodiment, a threshold may be defined as 10%, with events having probabilities of less than 10% being classified as unusual, or out of pattern. In an embodiment, a probability of 50% may be defined. In this embodiment, events having a probability of less than 50%, are less than likely to occur. In an embodiment, the probability may be expressed as the likelihood of transitioning from a current building state to a next building state represented by the new motion event data. In an embodiment, the threshold may be defined as any probability which suits the needs of a user and correlates with the Markov Chain probabilities representing the observed state changes. Any probability value may be practiced by the invention to detect unusual motion event transitions.

In an embodiment, event data having likelihoods associated with below threshold probabilities are registered as usage anomalies. The register of usage anomalies may be evaluated to discern new usage patterns. The status of the finite state machine and probability engine are continuously altered with new event data such that the state machine and engine represent the real-time usage patterns associated with the spaces of the building.

In an embodiment, a motion-sensor in room "A" registers motion long enough that its cumulative counter increases by two at timestamp 1534356469. The method calculates the interval between the current event and the last valid motion detection in room "A". Considering the date and time of the event, the likelihood of the calculated interval between detections is less than a defined threshold of 50% and an anomaly is registered. The anomaly may be noted to a building manager indicating that the usage of room "A" may be changing and that the room may be underutilized.

The register of anomalies may be used to alter usage schedules, lease occupancy and billing terms, real-time billable usage amounts, building maintenance activity schedules. In an embodiment, anomaly register values and evolving usage patterns may be provided as input to planners of building resource needs as well as external planners associated with meeting resource needs such as providing consumable resources and transportation to building occupants. In an embodiment, if this then that, or similar logical programming may be used to create automatic responses to registered anomalies. In an embodiment, the desired logic may be expressed as one or more policies defining the actions implemented under various usage conditions and usage pattern changes detected by the disclosed invention.

In an embodiment, the finite state machine may track occupancy data associated with space usage and may further track vacancy data associated with the absence of space usage. Changes to either occupancy patterns, vacancy patterns, or occupancy to vacancy and vacancy to occupancy patterns may also be detected by the occurrence of low probability events.

In an embodiment, the system variables may be defined as:

$\Delta r$: delta that will characterize the resolution of the discrete space. This is a fixed parameter;

$\Delta ts$: delta between the current motion time stamp event and the last one;

ots(t+1): occupancy new time stamp;
ots(t): occupancy current time stamp;
uts(t+1): vacancy new time stamp;
uts(t): vacancy current time stamp;
ij: probability to transition from a state i to a state j;
ostate(t+1): the next occupancy state based on the new time stamp;
ostate(t): the occupancy current state;
ustate(t+1): the next vacancy state based on the new time stamp;
ustate(t): the vacancy current state;
MCTM: a Markov Chain Transition Matrix;
MCTM[i][j]: the element of line i and column j of the MCTM; and
sum_MCTM(i): the sum of the values of the i-th line of the Markov Chain Transition Matrix.

FIG. 1 provides an illustration 1000 of the relationships of the above defined variables.

Using the above listed variables, the following algorithms may be defined to build the probability engine, (using a Markov Chain Transition Matrix as the probability engine):

for a predefined $\Delta r$, we have:

$\Delta ts = ots(t+1) - ots(t)$ $ostate(t+1) = \Delta ts / \Delta r$

MCTM[ostate(t+1)][ostate(t)]++

After the MCTM is built, it is possible to calculate the probability pij to go from ostate(t) to ostate (t+1):

$pij = MCTM[ostate(t)][ostate(t+1)]/\text{sum\_MCTM}(i)$.

If the probability pij is lower than a defined threshold, an anomaly is detected and registered.

In an embodiment, the previously defined MCTM only detects anomalies associated with occupancy scenarios. In order to also identify vacancy scenarios, it is necessary to add an addition set of states to handle the periods between occupancy time stamps. The vacancy time stamp will be generated when the difference between the last occupancy time stamp (ots(t)) and the current reading of the sensor that does not increment the motion readings is equal or higher than the predefined space resolution delta ($\Delta r$). The last occupancy time stamp needs to be retained in order to calculate the next occupancy state as defined above.

A way to formalize the behavior of waiting for an occupancy event is:

given a predefined $\Delta r$, we have:
While "not receiving an occupancy event" do:

$uts(t+1) = \Delta r * ustate(t)$ $ustate(t+1) = [uts(t+1) - uts(t)]/\Delta r$

In this way, it is possible to count the vacancy events using the MCTM and calculate the probability pij in the same way that was shown above. The advantage of this extension is to map not only occupancy to occupancy transition states or vacancy to vacancy transition states, but also occupancy to vacancy transitions and vice versa. To "navigate" on the MCTM and discover the indices of the vacancy states, it is only necessary to add the higher occupancy state value to the matrix and then add the vacancy state.

It is possible to formalize that as follows:
given a MCTM with m occupancy states, the transition from the occupancy state at time "t"(ostate(t)) to the vacancy state at time "t+1" (ustate(t+1)) is:

MCTM[ostate(t)][m+ustate(t+1)]

Figure 2:
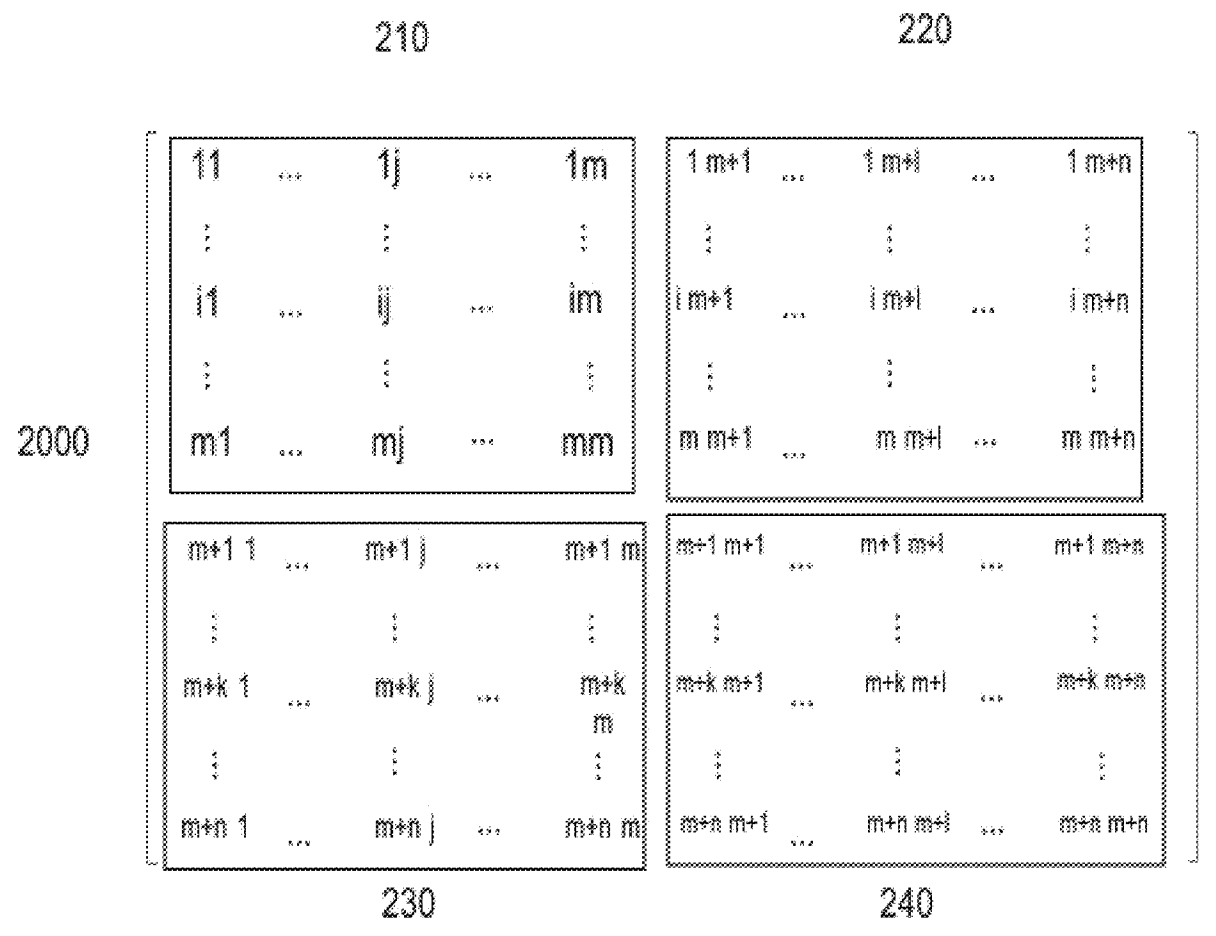

FIG. 2 provides a schematic illustration of a Markov Chain Transition Matrix 2000 with "m" occupancy states and "n" vacancy states. Using the MCTM of FIG. 2, the following probability transitions may be calculated:

occupancy to occupancy 210:

$pij = MCTM[ostate(t)][ostate(t+1)]/\text{sum\_MCTM}(i)$;

occupancy to vacancy 220:

$pi\ m+1 = MCTM[ostate(t)][ustate(t+1)]/\text{sum\_MCTM}(i)$;

vacancy to occupancy 230:

$pm+k\ j = MCTM[ustate(t)][ostate(t+1)]/\text{sum\_MCTM}(i)$; and vacancy to vacancy 240:

$pm+k\ m+1 = MCTM[ustate(t)][ustate(t+1)]/\text{sum\_MCTM}(i)$.

The method described above may be implemented in a variety of programming languages and, therefore, the necessary adaptations should be made depending on the chosen programming language.

Figure 3:
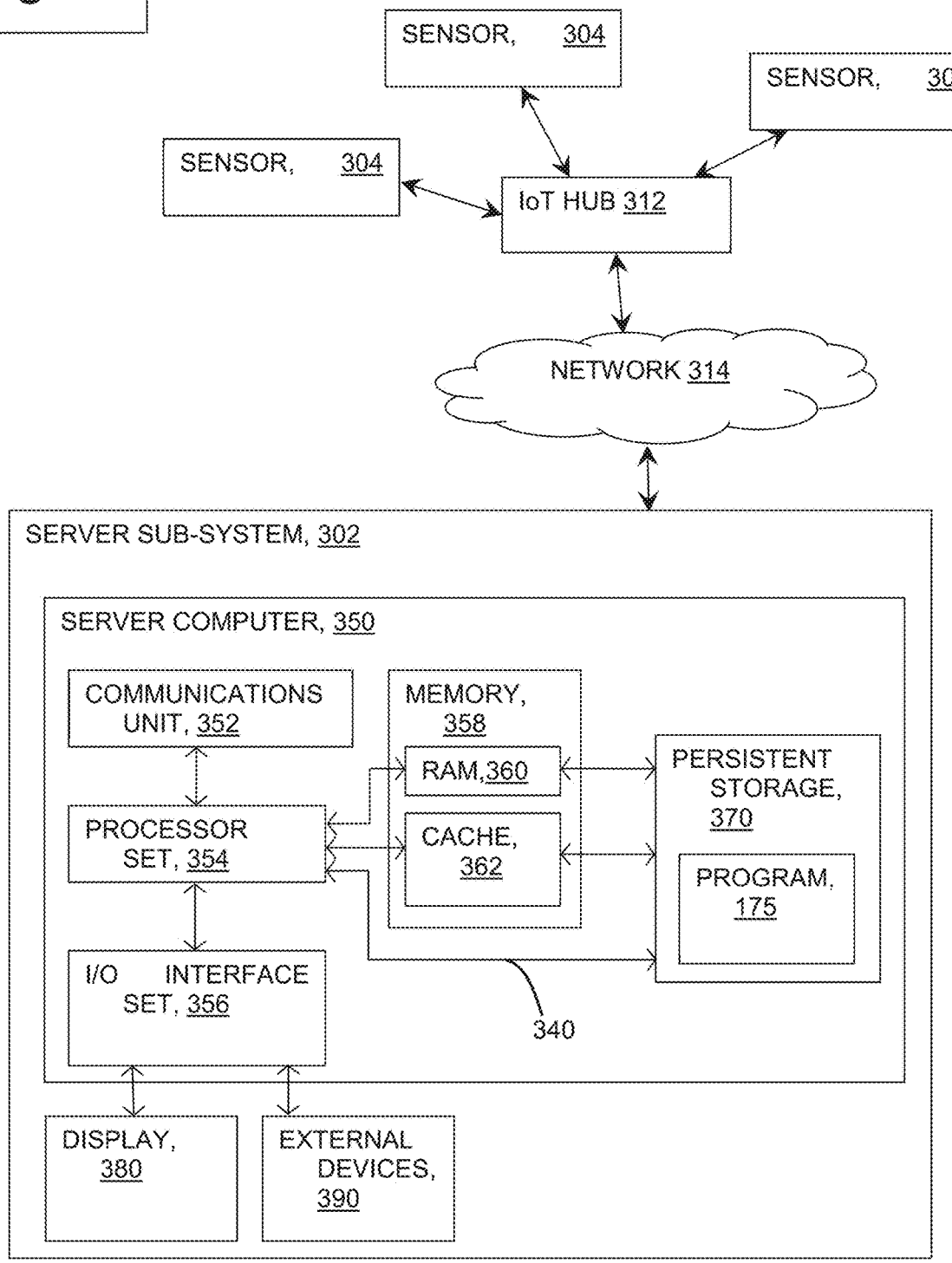
FIG. 3 provides a schematic illustration of a system, according to an embodiment of the invention.

FIG. 3 provides a schematic illustration of exemplary network resources associated with practicing the disclosed inventions. The inventions may be practiced in the processors of any of the disclosed elements which process an instruction stream. As shown in the figure, IoT sensors 304 connect wirelessly to server sub-system 302 via IoT hub 312 and network 314. As shown in FIG. 3, server sub-system 302 comprises a server computer 350. FIG. 3 depicts a block diagram of components of server computer 350 within a networked computer system 3000, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 350 can include processor(s) 354, cache 362, memory 358, persistent storage 370, communications unit 352, input/output (I/O) interface(s) 356 and communications fabric 340. Communications fabric 340 provides communications between cache 362, memory 358, persistent storage 370, communications unit 352, and input/output (I/O) interface(s) 356. Communications fabric 340 can be implemented with any architecture designed for passing data and/or control information between processors (such as microprocessors, communications and network processors, etc.), system memory, peripheral devices, and any other hardware components within a system. For example, communications fabric 340 can be implemented with one or more buses.

Memory 358 and persistent storage 370 are computer readable storage media. In this embodiment, memory 358 includes random access memory 360 (RAM). In general, memory 358 can include any suitable volatile or non-volatile computer readable storage media. Cache 362 is a fast memory that enhances the performance of processor(s) 354 by holding recently accessed data, and data near recently accessed data, from memory 358.

Program instructions and data used to practice embodiments of the present invention, e.g., the data processing program 175, are stored in persistent storage 370 for execution and/or access by one or more of the respective processor(s) 354 of server computer 350 via cache 362. In this embodiment, persistent storage 370 includes a magnetic hard disk drive. Alternatively, or in addition to a magnetic hard disk drive, persistent storage 370 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 370 may also be removable. For example, a removable hard drive may be used for persistent storage 370. Other examples include optical and magnetic disks, thumb drives, and smart cards that are inserted into a drive for transfer onto another computer readable storage medium that is also part of persistent storage 370.

Communications unit 352, in these examples, provides for communications with other data processing systems or devices, including resources of IoT sensing devices 304. In these examples, communications unit 352 includes one or more network interface cards. Communications unit 352 may provide communications through the use of either or both physical and wireless communications links. Software distribution programs, and other programs and data used for implementation of the present invention, may be downloaded to persistent storage 370 of server computer 350 through communications unit 352.

I/O interface(s) 356 allows for input and output of data with other devices that may be connected to server computer 350. For example, I/O interface(s) 356 may provide a connection to external device(s) 390 such as a keyboard, a keypad, a touch screen, a microphone, a digital camera, and/or some other suitable input device. External device(s) 390 can also include portable computer readable storage media such as, for example, thumb drives, portable optical or magnetic disks, and memory cards. Software and data used to practice embodiments of the present invention, e.g., data processing program 175 on server computer 350, can be stored on such portable computer readable storage media and can be loaded onto persistent storage 370 via I/O interface(s) 356. I/O interface(s) 356 also connect to a display 380.

Display 380 provides a mechanism to display data to a user and may be, for example, a computer monitor. Display 380 can also function as a touch screen, such as a display of a tablet computer.

Figure 4:
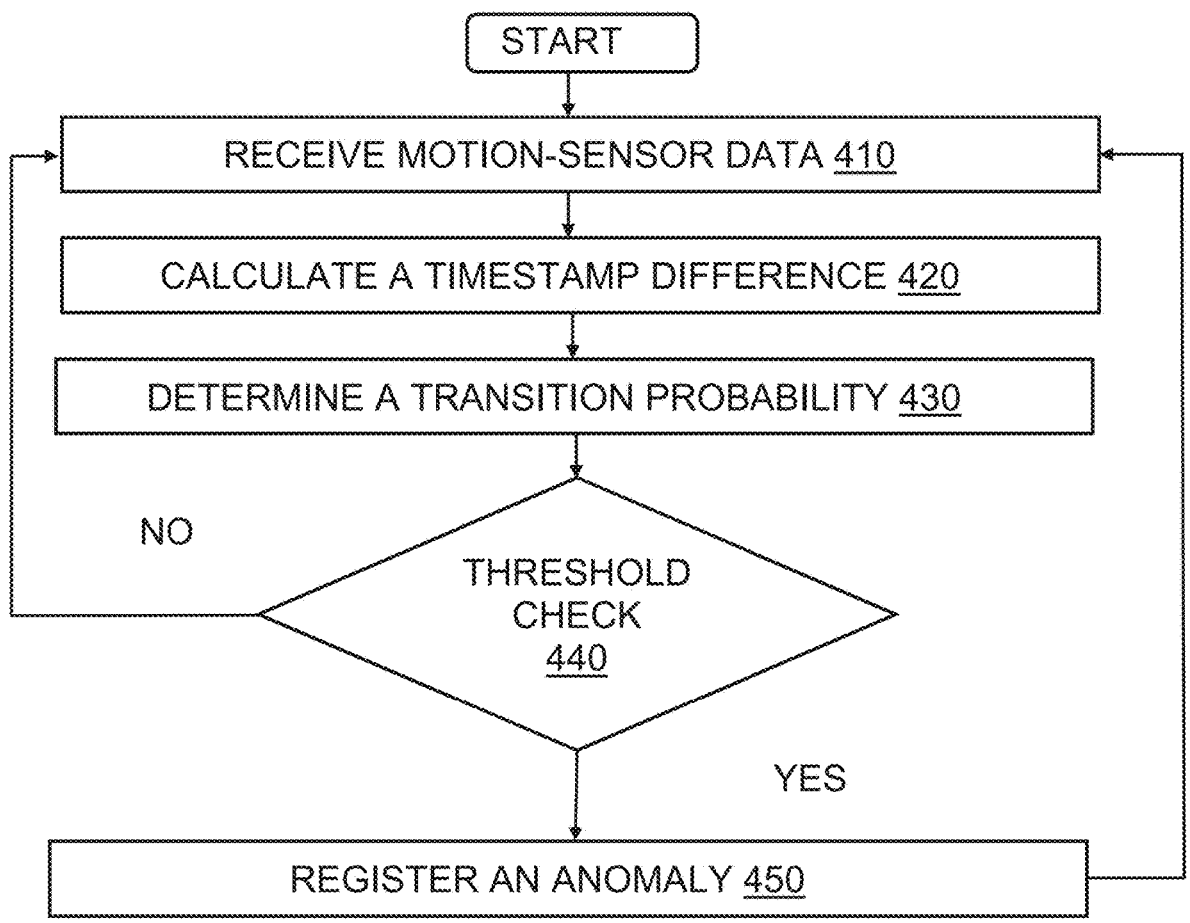
FIG. 4 provides a flowchart depicting an operational sequence, according to an embodiment of the invention.

FIG. 4 provides a flowchart 400, illustrating exemplary activities associated with the practice of the disclosure. After program start, Motion-sensor data is received at 410. The data may comprise a timestamp and a cumulative record of detected events. Data may be sent regardless of whether or not a new motion has been detected. The cumulative record may not have increased since the previous data record was received. A difference between the current (first) timestamp and a previous (second) timestamp may be calculated at 420. For events where the cumulative record has been incremented by two, the difference relates to a motion detection event. For instances where the cumulative record has not incremented by two, the timestamp difference may be determined as an indication an ongoing occupancy/vacancy condition. At 430, a probability of the recorded transition occurring is determined according to a prepared probability engine, such as a Markov Chain Transition Matrix. At 440, the determined probability of 430 is compared to a defined event threshold. Events having a probability below the defined threshold are registered as anomalous events at 450. Events having a determined probability above the threshold are not registered as anomalies. Monitoring of motion-sensor data resumes at 410.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
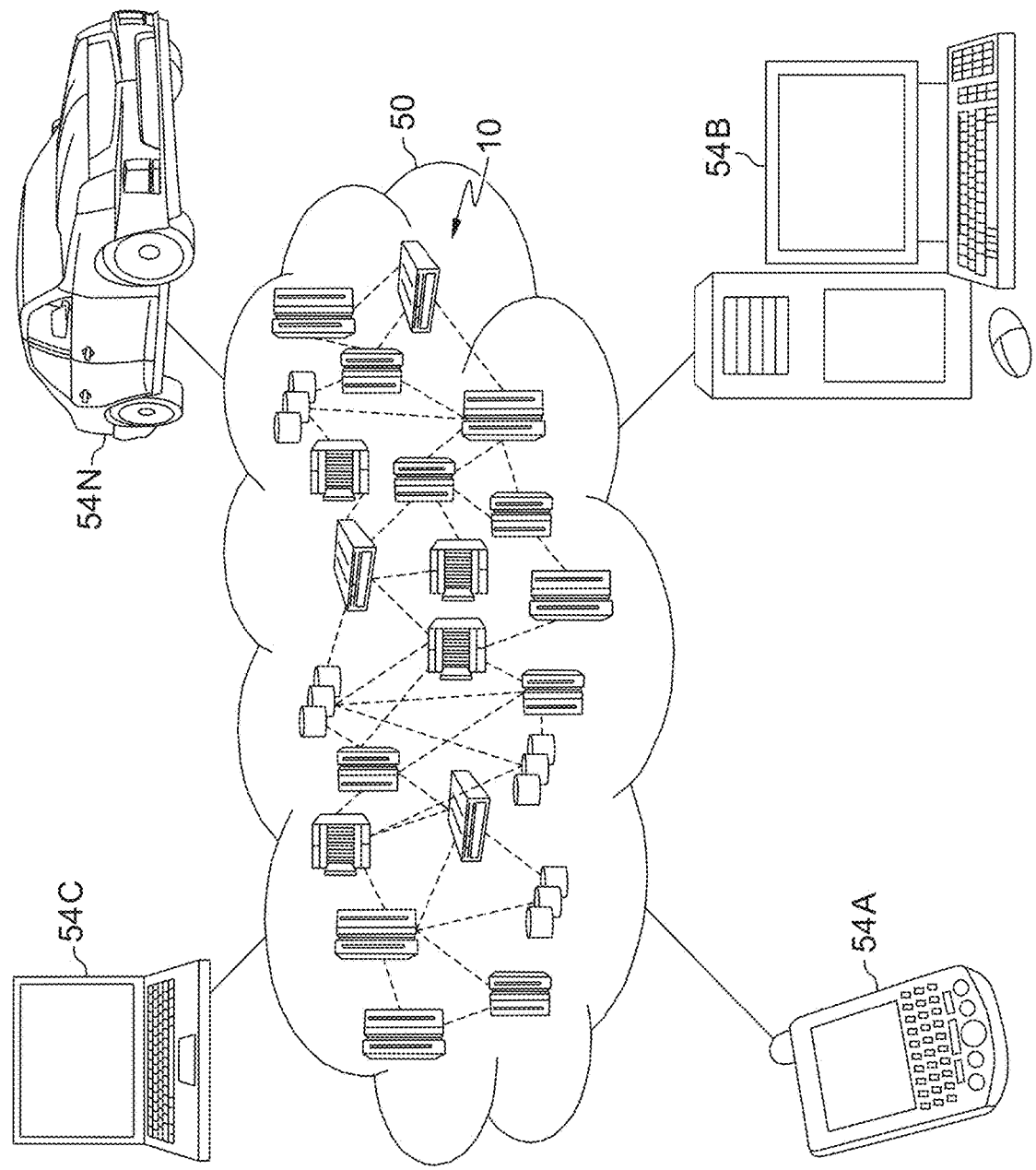
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
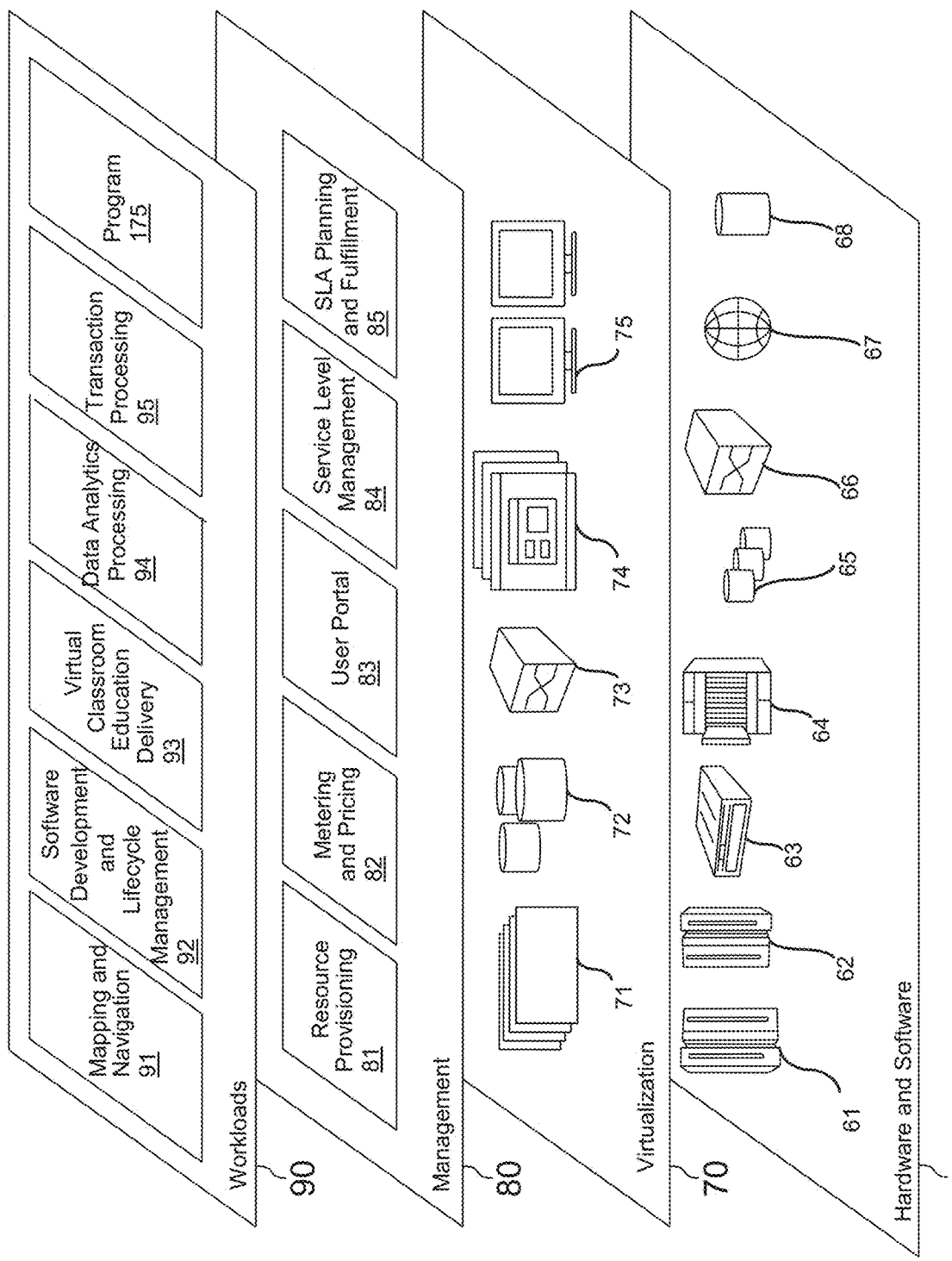
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data processing program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for processing sensor data, the computer implemented method comprising:
   receiving, by one or more computer processors, motion-detection data from a sensor;
   registering, by one or more computer processors, a current event associated with the motion-detection data at a first timestamp;
   incrementing, by one or more computer processors, a cumulative count associated with the sensor;
   calculating, by one or more computer processors, a difference between a second timestamp and the first timestamp, wherein the difference is a timestamp delta;
generating, by one or more computer processors, a finite state machine to count transitions between a set of timestamp deltas;
   generating, by one or more computer processors using the finite state machine, a Markov chain transition matrix;
   determining, by one or more computer processors using the Markov chain transition matrix, a probability of transitioning from a current state to a next state associated with the event;
   determining, by one or more computer processors, that the probability of transitioning from a current state to the next state associated with the event is less than a predetermined value; and
   registering, by one or more computer processors, an anomaly associated with the sensor and the event.

2. The computer implemented method according to claim 1, further comprising associating the anomaly with a physical area and altering a process associated with the physical area according to the anomaly.

3. The computer implemented method according to claim 1, further comprising registering a room occupancy anomaly.

4. The computer implemented method according to claim 1, further comprising registering a room vacancy anomaly.

5. The computer implemented method according to claim 1, further comprising registering a room occupancy to room vacancy anomaly.

6. The computer implemented method according to claim 1, further comprising registering a room vacancy to room occupancy anomaly.

7. The computer implemented method according to claim 1, further comprising:
   determining, by one or more computer processors, that the cumulative count has been increased by at least two;
   registering the current event as a valid event; and
   calculating the difference between a last valid event and the current event as timestamp delta.

8. A computer program product for processing sensor data, the computer program product comprising one or more computer readable storage devices and stored program instructions on the one or more computer readable storage devices, the stored program instructions comprising:
   programmed instructions for receiving motion-detection data from a sensor;
   programmed instructions for registering a current event associated with the motion-detection data at a first timestamp;
   programmed instructions for incrementing a cumulative count associated with the sensor;
   programmed instructions for calculating a difference between a second timestamp and the first timestamp, wherein the difference is a timestamp delta;
   programmed instructions for generating a finite state machine to count transitions between a set of timestamp deltas;
   programmed instructions for generating, using the finite state machine a Markov chain transition matrix;
   programmed instructions for determining, using the Markov chain transition matrix, a probability of transitioning from a current state to a next state associated with the event;
   programmed instructions for determining that the probability of transitioning from a current state to the next state associated with the event, is less than a predetermined value; and
   programmed instructions for registering an anomaly associated with the sensor and the event.

9. The computer program product according to claim 8, the stored program instructions further comprising:
   programmed instructions for associating the anomaly with a physical area; and
   programmed instructions for altering a process associated with the physical are according to the anomaly.

10. The computer program product according to claim 8, the stored program instructions further comprising programmed instructions for registering a room occupancy anomaly.

11. The computer program product according to claim 8, the stored program instructions further comprising programmed instructions for registering a room vacancy anomaly.

12. The computer program product according to claim 8, the stored program instructions further comprising programmed instructions for registering a room occupancy to room vacancy anomaly.

13. The computer program product according to claim 8, the stored program instructions further comprising programmed instructions for registering a room vacancy to room occupancy anomaly.

14. The computer program product according to claim 8, the stored program instructions further comprising:
   programmed instructions for determining, by one or more computer processors, that the cumulative count has been increased by at least two;
   programmed instructions for registering the current event as a valid event; and
   programmed instructions for calculating the difference between a last valid event and the current event as timestamp delta.

15. A computer system for processing sensor data, the computer system comprising:

one or more computer processors;
one or more computer readable storage devices;
stored program instructions on the one or more computer readable storage devices for execution by the at least on computer processor, the stored program instructions comprising:
  programmed instructions for receiving motion-detection data from a sensor;
  programmed instructions for registering a current event associated with the motion-detection data at a first timestamp;
  programmed instructions for incrementing a cumulative count associated with the sensor;
  programmed instructions for calculating a difference between a second timestamp and the first timestamp, wherein the difference is a timestamp delta;
  programmed instructions for generating a finite state machine to count transitions between a set of timestamp deltas;
  programmed instructions for generating, using the finite state machine a Markov chain transition matrix;
  programmed instructions for determining, using the Markov chain transition matrix, a probability of transitioning from a current state to a next state associated with the event;
  programmed instructions for determining that the probability of transitioning from a current state to the next state associated with the event, is less than a predetermined value; and
  programmed instructions for registering an anomaly associated with the sensor and the event.

16. The computer system according to claim 15, the stored program instructions further comprising:
  programmed instructions for associating the anomaly with a physical area; and
  programmed instructions for altering a process associated with the physical area according to the anomaly.

17. The computer system according to claim 15, the stored program instructions further comprising programmed instructions for registering a room occupancy anomaly.

18. The computer system according to claim 15, the stored program instructions further comprising programmed instructions for registering a room vacancy anomaly.

19. The computer system according to claim 15, the stored program instructions further comprising programmed instructions for registering a room occupancy to room vacancy anomaly.

20. The computer system according to claim 15, the stored program instructions further comprising:
  programmed instructions for determining, by one or more computer processors, that the cumulative count has been increased by at least two;
  programmed instructions for registering the current event as a valid event; and
  programmed instructions for calculating the difference between a last valid event and the current event as timestamp delta.

* * * * *